United States Patent [19]

Ishida et al.

[11] 4,387,428

[45] * Jun. 7, 1983

[54] METHOD OF AND APPARATUS FOR PROCESSING A RADIATION IMAGE

[75] Inventors: Masamitsu Ishida; Hisatoyo Kato; Seiji Matsumoto, all of Minami-ashigara, Japan

[73] Assignee: Fuji Photo Film Co., Ltd., Kanagawa, Japan

[*] Notice: The portion of the term of this patent subsequent to Feb. 9, 1999, has been disclaimed.

[21] Appl. No.: 220,780

[22] Filed: Dec. 29, 1980

[30] Foreign Application Priority Data

Dec. 25, 1979 [JP] Japan .................. 54-168937

[51] Int. Cl.$^3$ ............................................. H04N 1/40
[52] U.S. Cl. ................................. 364/414; 250/337; 358/284; 364/515
[58] Field of Search .................. 364/414, 515; 358/96, 358/111, 166, 280, 284; 250/327.1, 330, 337

[56] References Cited

U.S. PATENT DOCUMENTS

| | | | |
|---|---|---|---|
| 4,196,453 | 4/1980 | Warren ............................. | 364/515 |
| 4,315,318 | 2/1982 | Kato et al. ...................... | 364/414 |
| 4,317,179 | 2/1982 | Kato et al. ...................... | 364/414 |

Primary Examiner—Errol A. Krass
Attorney, Agent, or Firm—Gerald J. Ferguson, Jr.; Joseph J. Baker

[57] ABSTRACT

A method of and apparatus for processing a radiation image in a radiation image recording system in which a stimulable phosphor is stimulated with a scanning stimulating ray and the light emitted from the stimulable phosphor upon stimulation by the stimulating ray is detected by a detector which gives an output to be processed and used for recording a visible image on a recording material. In the processing of the detected output, an operation represented by a formula $$S' = Sorg + F(X)$$

is conducted at every scanning point, where Sorg is the original image signal detected by the detector, Sus is an unsharp mask signal corresponding to a super-low spatial frequency, X is Sorg-Sus, and F(X) is a monotonically increasing function which satisfies the condition of $F'(X_1) \geq F'(X_2) \geq 0$ for arbitrary values $X_1$, $X_2$ of X ($|X_1| < |X_2|$) and in which there exists at least one certain value $X_0$ of X which satisfies the condition of $F'(X_1) > F'(X_2)$ when $|X_1| < |X_0| < |X_2|$.

10 Claims, 8 Drawing Figures

METHOD OF AND APPARATUS FOR PROCESSING A RADIATION IMAGE

BACKGROUND OF THE INVENTION

1. Field of the Invention

This invention relates to a method of processing a radiation image in a radiation image recording system used for medical diagnosis and an apparatus therefor. This invention particularly relates to an image processing method and apparatus in a radiation image recording system in which a stimulable phosphor is used for recording radiation image information as an intermediate recording medium and the image recorded therein is read out for reproduction and finally recorded on a recording medium.

2. Description of the Prior Art

It is known in the art as disclosed in U.S. Pat. No. 3,859,527 to record radiation image information in a stimulable phosphor by exposing the phosphor to radiation transmitting through an object like a human body, then read out the recorded information by use of a photodetector by stimulating the phosphor with a scanning laser beam or the like, and record the read out information on a recording medium by modulating a recording laser beam or the like with the information read out by the photodetector.

The above-described radiation image recording system is far more advantageous than the conventional radiography using a silver halide photographic film in that the image is recorded over a very wide range of radiation exposure. Therefore, this system is particularly valuable when it is applied to medical diagnosis in which the human body is recorded like in the conventional radiography. By using this system for such purposes, it becomes possible to obtain the information which cannot be obtained in conventional radiography because of the limited exposure range that can be recorded and observed on conventional X-ray film.

Further, since the X-rays do harm to the human body, it is impossible from the viewpoint of safety to expose the human body to X-rays of high dosage. Therefore, it is desired that the necessary information in the radiography be obtained by exposing the human body only once to the X-ray of comparatively low dosage. On the other hand, radiographs should preferably have both wide exposure latitude and high image quality of high contrast, high sharpness, low noise etc. for viewing and diagnosis. Unfortunately, since the conventional radiography is designed so as to satisfy all the required conditions to some extent, the range of recording density or the ability to record various levels of information and the image quality are both insufficient and neither of these properties are completely satisfied.

The radiation image recording system as mentioned hereinbefore disclosed in U.S. Pat. No. 3,859,527 does not solve the above problems in the conventional radiography, though the system itself is a novel one.

The inventors of the present invention have found a new process and apparatus which solve the above mentioned problems and satisfy both the wide exposure latitude and the high image quality of high contrast, high sharpness and low noise in a radiation image recording system using a stimulable phosphor as disclosed in a copending application; United States patent application Ser. No. 104,855 now U.S. Pat. No. 4,315,318. According to this method and apparatus, a radiation image having high diagnostic efficiency and accuracy can be economically obtained at a high speed.

The method and apparatus of the above mentioned patent are characterized in that, in the course of scanning a stimulable phosphor with a stimulating ray, reading out the radiation image information recorded thereon, converting the read out information into an electric signal and recording a visible image on a recording medium using the electric signal, an unsharp mask signal Sus corresponding to a super-low frequency is obtained for each scanning point and a signal conversion represented by a formula $$S' = Sorg + \beta(Sorg - Sus)$$

where Sorg is an original image signal read out from the stimulable phosphor and $\beta$ is an emphasis coefficient is performed to emphasize the frequency component above the super-low frequency. In this method and apparatus, the emphasis coefficient $\beta$ may be a fixed value or a variable value. In the latter case, the emphasis coefficient $\beta$ may be varied with either Sorg or Sus.

However, according to the research and investigations conducted further thereafter by the inventors of the present invention, an artifact is liable to appear in the low and high brightness regions when the emphasis coefficient $\beta$ is fixed. When the emphasis coefficient $\beta$ is made variable, on the other hand, it was found that, in case that $\beta$ was a monotonically increasing function ($\beta' \geq 0$) for instance, the artifact was prevented from appearing in the low brightness region where Sorg or Sus was small, but it was difficult to prevent the appearance of the artifact in the form of black lines in the muscle area around the boundary of a muscle and a bone for example. In other words, in the above described method, it was difficult to completely prevent from occurring artifacts such as the low brightness portions around the boundaries of edges in an image of bones and muscles becoming saturated white to the fog level of the recording medium or the high brightness portions around the boundaries becoming black lines, or the contour lines appearing around the contour of the barium sulfate contrast medium overemphasized in a radiographic image of a stomach (Magen). Thus, in the above described method it was difficult to sufficiently improve the diagnostic efficiency and accuracy of the finally obtained radiation image and there was a fear of making an error in diagnosis in some cases due to the artifacts.

SUMMARY OF THE INVENTION

It is, therefore, the primary object of the present invention to provide a radiation image processing method and apparatus capable of obtaining a radiation image high of diagnostic efficiency and accuracy free from the above artifacts.

A more specific object of the present invention is to provide a radiation image processing method and apparatus for obtaining a radiation image free from artifacts in an economical way at a high speed.

The above objects are accomplished by reducing the increase in the degree of frequency emphasis in the region where the difference of |Sorg-Sus| is large by conducting an operation represented by a formula $$S' = Sorg + F(X) \ldots \quad (1)$$

where X is X=Sorg-Sus and F(X) is a monotonically increasing function which satisfies the condition of $F'(X_1) \geq F'(X_2) \geq 0$ for arbitrary values $X_1$, $X_2$ of X ($|X_1| < |X_2|$) and in which there exists at least one certain value $X_0$ of X which satisfies the condition of $F'(X_1) > F'(X_2)$ when $|X_1| < |X_0| < |X_2|$.

In other words, the method and apparatus in accordance with the present invention are characterized in that, in the course of scanning a stimulable phosphor with a stimulating ray, reading out the radiation image information recorded thereon, converting the read out information into an electric signal and recording a visible image on a recording medium using the electric signal, an unsharp mask signal Sus corresponding to the super-low frequency is obtained for each scanning point and a signal conversion represented by a formula $$S' = Sorg + F(X)$$

is performed to emphasize the frequency component above the super-low frequency, where X is X=Sorg-Sus and F(X) is a monotonically increasing function which satisfies the condition of $F'(X_1) \geq F'(X_2) \geq 0$ for arbitrary values $X_1$, $X_2$ of X ($|X_1| < |X_2|$) and in which there exists at least one certain value $X_0$ of X which satisfies the condition of $F'(X_1) > F'(X_2)$ when $|X_1| < |X_0| < |X_2|$. It should be noted that the value $|X_0|$ is within the range of $|X| = |Sorg-Sus|$.

Said function F(X) will be understood to include various functions such as a function F(X) satisfying the conditions of $F''(X) > 0$ when $X < 0$ and $F''(X) < 0$ when $X > 0$ and a function in which a part or whole of this nonlinear function is approximated by one or more linear functions.

Further, the function F(X) is not necessarily a function of X alone which is X=Sorg-Sus, but may also be a function of Sorg or Sus as well. This means mathematically that said formula (1) includes a formula in which F(X) is replaced by $\beta(Sorg) \cdot f(X)$ or $\beta(Sus) \cdot f(X)$. In these cases, it should be noted that said F'(X) or F'''(X) means $\partial F(X)/\partial X$ or $\partial^2 F(X)/\partial X^2$, respectively.

As for the monotonically increasing function F(X) where X is X=Sorg-Sus in said formula (1), there may be used a nonlinear monotonically increasing function such as $$F(X) = a \cdot sgn(X) \cdot |X|^n + b \tag{2}$$

where $a$ and b are constants and $a > 0$, $0 < n < 1$, sgn X=1 (X>1), sgn X=−1 (X<1), sgn X=0 (X=0), $$F(X) = a \cdot \sin(pX) \tag{3}$$

where $a > 0$, $|pX| < \pi/2$, or $$\left. \begin{array}{l} F(X) = 1 - e^{-X} (X > 0) \\ F(X) = -1 + e^{X} (X < 0) \end{array} \right\} \tag{4}$$

These formulae (2), (3), (4) all satisfy the conditions of $F'(X_1) > F'(X_2) > 0$ when $|X_1| < |X_2|$ and said conditions of $F'(X_1) \geq F'(X_2) \geq 0$. Further, these functions all satisfy the conditions of $F''(X) < 0$ (X>0) and $F''(X) > 0$ (X<0) and F'(X) is gradually reduced (gradient is decreasing) as X increases in the region of positive X in a nonlinear form.

However, as mentioned above, the function F(X) may have a part where the secondary differentiation F''(X) is zero, namely a linear part, or may be in such a form that the F''(X) is zero throughout its whole range so long as above conditions are satisfied. One example of such a form wherein the F''(X) is zero throughout its whole range and the condition of $F'(X_1) > F'(X_2)$ is satisfied is a combination of several linear functions connected in series approximating said nonlinear functions (2), (3) and (4).

For instance, a function of a combination of linear functions as follows can be employed.

$$\left. \begin{array}{l} F(X) = aX \, (|X| < |X_1|) \\ F(X) = sgn(X) \, (b|X| + c) \, (|X_1| \leq |X| < |X_2|) \\ F(X) = sgn(X) \, (d|X| + e) \, (|X_2| \leq |X|) \end{array} \right\} \tag{5}$$

(wherein $a > b > d > 0$, $c = a|X_1| - b|X_1|$, $e = b|X_2| + c - d|X_2| = a|X_1| + b(|X_2| - |X_1|) - d|X_2|$)

Further, in case that F(X) is substituted by $\beta(Sorg) \cdot f(X)$ or $\beta(Sus) \cdot f(X)$, the following functions can be used for instance as the function f(X).

$$\left. \begin{array}{l} f(X) = aX \, (|X| < |X_1|) \\ f(X) = b\left[1 - \exp\left\{-\dfrac{a}{b}(X - |X_1|)\right\}\right] + \\ \quad a|X_1| \, (X \geq |X_1|) \\ f(X) = -b\left[1 - \exp\left\{\dfrac{a}{b}(X + |X_1|)\right\}\right] - \\ \quad a|X_1| \, (X \leq -|X_1|) \end{array} \right\} \tag{6}$$

where $a$ and b are positive constants. The function f(X) is, however, enough to be a function satisfying the conditions required for said function F(X). Therefore, said F(X) as shown in the formulae (2), (3), (4) and (5) can also be used as the function f(X).

Further, it should be noted that although the above mentioned functions F(X) are all in the form of point symmetry with respect to the origin the function F(X) to be employed in this invention is not always limited to such a point symmetric function.

In accordance with the present invention, since the first differentiation F'(X) of the function of the difference between Sorg and Sus is made smaller in the region where $|X|$ is larger and positive in such region, the rate of the increase in the degree of frequency emphasis is reduced as well as the degree of emphasis itself is increased in the range of larger $|X|$, whereby the occurrence of artifacts is prevented.

That is to say, in accordance with the present invention, the frequency emphasis by the unsharp masking process is conducted normally in the range where the difference signal is small and the rate of increase in the degree of frequency emphasis is reduced in the range where the difference signal is large, e.g. at the boundary between a bone and a muscle, the boundary between a soft tissue portion and a gas-filled portion, the boundary between the barium sulfate filled portion and the environment thereof, the blood vessels in the angiography, whereby the occurrence of artifacts is prevented.

Further, it should be noted that when said F(X) is replaced by $\beta(Sorg) \cdot f(X)$ or $\beta(Sus) \cdot f(X)$ in the formula (1), $\beta(Sorg)$ or $\beta(Sus)$ naturally changes as Sorg or Sus changes, and accordingly the results obtained in case that $\beta$ is made variable as disclosed in said U.S. Pat. No.

4,315,318 are also obtained in addition to said various results in the present invention.

In other words, it is further possible to prevent the occurrence of artifacts having contours which are liable to occur in the boundaries in the low brightness region.

The unsharp mask signal Sus referred to in this invention means a signal representing every scanning point which is made by blurring the original image signal to contain only the frequency component lower than the super-low frequency. In other words, the unsharp mask signal Sus is a signal representing an unsharp image obtained by blurring the original image to such an extent that the unsharp mask signal contains only the super-low frequency. In the unsharp mask corresponding to the unsharp image, the modulation transfer function is not less than 0.5 at the spatial frequency of 0.01 cycle/mm and not more than 0.5 at the spatial frequency of 0.5 cycle/mm. Further, in order to enhance the diagnostic efficiency and accuracy remarkably, it is desired to use an unsharp mask in which the modulation transfer function is not less than 0.5 at the spatial frequency of 0.02 cycle/mm and not more than 0.5 at the spatial frequency of 0.15 cycle/mm.

In other words, the unsharp mask to be used in the present invention can be defined as the one in which the spatial frequency fc at which the modulation transfer function becomes 0.5 is within the range of 0.01 to 0.5 cycle/mm, and preferably within the range of 0.02 to 0.15 cycle/mm.

Further, it should be noted that the original signal referred to in this invention includes a signal which has been processed with a well known signal processing means used in the field of optical instruments, that is, the signal which has been nonlinearly amplified by logarithmic amplification or the like for band compression or nonlinear compensation. It is often useful to log-compress the signal to compress the band range of the signal when a signal representing intensity of light or the like is processed.

The unsharp mask can be obtained by the following methods for example.

(1) The original image signal at every scanning point is memorized and the memorized original image signals are read out together with the surrounding signals according to the size of the unsharp mask to obtain a mean value as the unsharp mask signal Sus. (The mean value is obtained as an simple arithmetical mean or various kinds of weighted mean.) In this method, the unsharp mask is made in the form of analog signals or in the form of digital signals after A/D conversion. Further, it is also possible to make the unsharp mask by transmitting the analog signal through a low pass filter in the primary scanning direction and processing the signal in the digital form in the sub-scanning direction.

(2) After the original image signal is read out by use of a light beam or the like having a small diameter, the unsharp mask signal is read out by use of a light beam having a larger diameter. This is possible in case that the stimulable phosphor is still stimulable after the first stimulation.

(3) The expansion of the diameter of the stimulating light beam which occurs while the beam passes through the stimulable phosphor layer by scattering is utilized. When the stimulating light beam scans the stimulable phosphor, the original image signal Sorg is obtained on the incident side of the phosphor layer and the unsharp mask signal Sus is obtained on the opposite side of the phosphor layer. In this case, the size of the unsharp mask can be controlled by changing the extent of light scattering effect by the phosphor layer or changing the size of the aperture used for receiving the scattering light.

Among the above three methods, the first method is the most preferable from the viewpoint of ability of giving flexibility to the image processing.

In order to carry out the first method, the following operation of the arithmetic mean is conducted for every scanning point to obtain the unsharp mask signal Sus.

$$Sus = \sum_{i,j \in 0} a_{ij} Sorg(i,j) \qquad (7)$$

where i and j are coordinates of the circular area having the scanning point at the center thereof and $a_{ij}$ is a weighting coefficient which should preferably have a smooth variation in all the radial directions isotropically and satisfies the formula $$\sum_{i,j \in 0} a_{ij} = 1.$$

Said circular area includes N number of picture elements in the direction of the diameter thereof.

However, in order to simply carry out the above operation, it is necessary to conduct the $(\pi/4)N^2$ times of multiplications and $(\pi/4)N^2$ times of additions. Therefore, when N is a large number it takes a very long time to conduct the operation, which is impractical. Since it is necessary to scan the stimulable phosphor plate with a sampling rate of 5 to 20 pixel/mm (50 to 200μ in terms of the size of the picture element) in order to preserve the necessary frequency components of the image, the number of the picture elements (N) included in the unsharp mask corresponding to the super-low frequency is inevitably large and accordingly it takes a very long time to conduct the above operation. For instance, in case of using an unsharp mask having a weighting coefficient having a Gaussian distribution, N becomes about 50 when the size of the picture element is 100μ×100μ and fc=0.1 cycle/mm and about 250 if fc=0.02 cycle/mm. This means that the time for conducting the above operation will be considerably long.

Further, in order to obtain the arithmetic mean for the circular area, the range in which the addition is to be conducted should be changed for every scanning line, which makes the operating mechanism very complex and costly.

Therefore, it is desirable to simplify the operation to reduce the time for conducting the operation to obtain the unsharp mask signal. One example of such simplification methods is to obtain the simple arithmetic mean (non-weighted arithmetic mean) over a rectangular area enclosed with two lines parallel to the primary scanning direction and two lines parallel to the sub-scanning direction. In other words, the unsharp mask signal Sus is obtained by calculating the simple arithmetic mean of the original image signals Sorg within the rectangular area. Another example of such simplifications is to make a blurred signal in the primary scanning direction by transmitting the analog signal of the original image signal through a low-pass filter and then obtaining the arithmetic mean of the A/D converted digital signals in the sub-scanning direction. These methods were disclosed in the copending application; U.S. Pat. No. 4,315,318 now U.S. Pat. No. 4,315,318.

In the former method in which the unsharp mask signal Sus is obtained by a simple arithmetic mean within a rectangular area, it has been proved by the present inventors that the results in the diagnostic efficiency and accuracy were as good as those obtained by use of the ideal circular unsharp mask having a Gaussian distribution in its weighting coefficient, although the above method should have defects in that the rate of unsharpness is different in the direction and further the transfer function has an undesirable fluctuation as compared with the mask having a smoothly changing weighting coefficient in the form of Gaussian distribution. Further, this method is much more advantageous in that the operation is very simple and accordingly does not take a long time, which results in high speed and low cost of the image processing apparatus. These advantages are true for both the analog and digital signals.

Since the modulation transfer function of the rectangular unsharp mask having a uniform weighting becomes a sinc function (sinc(x)=(sin $\pi x/\pi x$), the aforesaid definition that the spatial frequency fc in which the modulation transfer function becomes 0.5 is 0.01 to 0.5 cycle/mm, preferably 0.02 to 0.15 cycle/mm is equivalent to that the rectangular unsharp mask has a size of 60 mm to 1.2 mm, preferably 30 mm to 4 mm. Further, in case that the shape of the unsharp mask is an elongated rectangle, each side of the rectangle is preferred to have a length within the above range. In case of the image processing of a linear tomography, the unsharp mask is preferred to have an elongated rectangular shape.

In the latter method in which a low-pass filter is used for obtaining a unsharp mask signal Sus, it has also been proved by the present inventors that the results in the diagnosis efficiency and accuracy were as good as those obtained by use of the ideal circular unsharp mask having a varying weighting coefficient, although the above method does not have a uniform balanced weighting coefficient. Further, this method is much more advantageous in that the operation is very simple and accordingly does not take a long time by only performing a low-pass filtering of the analog signal in the primary scanning direction thereby making the operation of the digital signals that will take some time unnecessary. This results in high speed and low cost of the image processing apparatus. In addition, if the addition of the digital signals in the sub-scanning direction is made to be a simple arithmetic addition to obtain an arithmetic mean, there is no need to conduct multiplication, which also results in simplification of the apparatus and speed up of the operation. It has also been proved by the present inventors that even with such a very simplified method the resulting diagnostic efficiency and accuracy is not substantially lower than that resulting from the method in which the unsharp mask is obtained through an ideal operation which requires a long time.

In the present invention, it is possible to conduct a smoothing process in addition to the above mentioned unsharp masking process. In general, since there appear noises particularly in the high frequency range, the diagnostic efficiency and accuracy is normally enhanced by conducting a smoothing process. As for the smoothing process, it is desirable to make the modulation transfer function not less than 0.5 at the spatial frequency of 0.5 cycle/mm and not more than 0.5 at the spatial frequency of 5 cycle/mm. The desirable extent of smoothing depends upon the kinds of the radiation image. For instance, in case of the chest tomography in which the pattern having a comparatively low frequency is to be observed, it is desired that the noise be removed as much as possible. To the contrary, in case of the angiography in which the fine patterns including fine blood vessels of high frequency, the too much smoothing will damage the fine patterns and lowers the quality of the image. According to the research by the present inventors, however, the diagnostic efficiency and accuracy are enhanced for almost all the kinds of radiation image when the smoothing process is conducted within said range. Furthermore, it has also been confirmed that the smoothing process is effective not only when it is applied to the signal S' after the unsharp masking process but also when it is applied directly to the original image signal Sorg.

Further, in this invention, a gradation processing can be conducted in addition to the above unsharp masking process. The gradation processing (such as contrast enhancement using nonlinear or linear signal transformation) is particularly effective for the radiation image in which the density or intensity of emitted light is gently changed over a wide range such as the image of lung cancer or mamma cancer. The gradation processing applicable to the radiation image recording system is shown in U.S. patent application Ser. Nos. 106,733, 123,578 and 124,770 filed by the same applicant. The gradation processing can be conducted before or after the unsharp masking process.

The stimulable phosphor referred to in this invention means a phosphor which is able to store radiation energy upon exposure thereof to a radiation as of light or high energy radiations and then emits light according to the stored energy upon optical, thermal, mechanical, chemical or electrical stimulation. The stimulable phosphor is desired to emit light having a wavelength within the range of 300 to 500 nm. For example, rare earth activated alkaline earth metal fluorohalide phosphor is preferred. One example of this phosphor is, as shown in U.S. patent application Ser. No. 57,080, a phosphor represented by the formula $(Ba_{1-x-y},Mg_x,Ca_y)FX$:a-$Eu^{2+}$ wherein X is at least one of Cl and Br, x and y are numbers satisfying $0<x+y\leq 0.6$ and $xy\neq 0$, and a is a number satisfying $10^{-6}\leq a\leq 5x^{-2}$. Another example of this phosphor is, as shown in U.S. patent application Ser. No. 57,091, a phosphor represented by the formula $(Ba_{1-x},M^{II}_x)FX$:yA wherein $M^{II}$ is at least one of Mg, Ca, Sr, Zn and Cd, X is at least one Cl, Br and I, A is at least one of Eu, Tb, Ce, Tm, Dy, Pr, Ho, Nd, Yb and Er, x is a number satisfying $0\leq x\leq 0.6$, and y is a number satisfying $0\leq y\leq 0.2$, Further, as the stimulable phosphor to be used in this invention can be used ZnS:Cu,Pb; $BaO.xAl_2O_3$:Eu wherein $0.8\leq x\leq 10$; and $M^{II}O.xSiO_2$:A wherein $M^{II}$ is Mg, Ca, Sr, Zn, Cd or Ba, A is CE, Tb, Eu, Tm, Pb, Tl, Bi or Mn, and x is a number satisfying $0.5\leq x\leq 2.5$, as shown in U.S. Pat. No. 4,236,078. Furthermore, as the stimulable phosphor can be used LnOX:xA wherein Ln is at least one of La, Y, Gd and Lu, X is at least one of Cl and Br, A is at least one of Ce and Tb, x is a number satisfying $0<x<0.1$, as shown in U.S. Pat. No. 4,236,078. Among the above numerated phosphors, the rare earth activated alkaline earth metal fluorohalide phosphor is the most preferable, among which barium fluorohalides are the most preferable in view of the high intensity of emission of light.

Further, it is desirable to color the phosphor layer of the stimulable phosphor plate made of the above phosphor by use of pigments or dyes to improve the sharpness of the image obtained thereby as disclosed in U.S. patent application Ser. No. 156,520.

As for the stimulating rays for stimulating the phosphor after the phosphor is excited with the radiation energy in an image pattern, a laser beam having high directivity is used. As the laser beam, a laser having a wavelength within the range of 500 to 800 nm, preferably of 600 to 700 nm is preferred. For example, a He-Ne laser (633 nm) or a Kr laser (647 nm) can be used. If a color filter which cuts the light having a wavelength beyond the range of 500 to 800 nm is used together with a light source, a light source having a wavelength distribution beyond said range can be used.

The radiation image information read out by use of the device of this invention is used to reproduce a radiation image on a recording medium such as a silver halide photographic film, a diazo film or an electrophotographic recording material. Further, it is possible to reproduce the radiation image on a cathode ray tube.

Now the present invention will be described in more detail with reference to the accompanying drawing as briefly described below.

DESCRIPTION OF THE PREFERRED EMBODIMENTS

Now several preferred embodiments of the present invention will be described in detail referring to the accompanying drawings.

Figure 1:
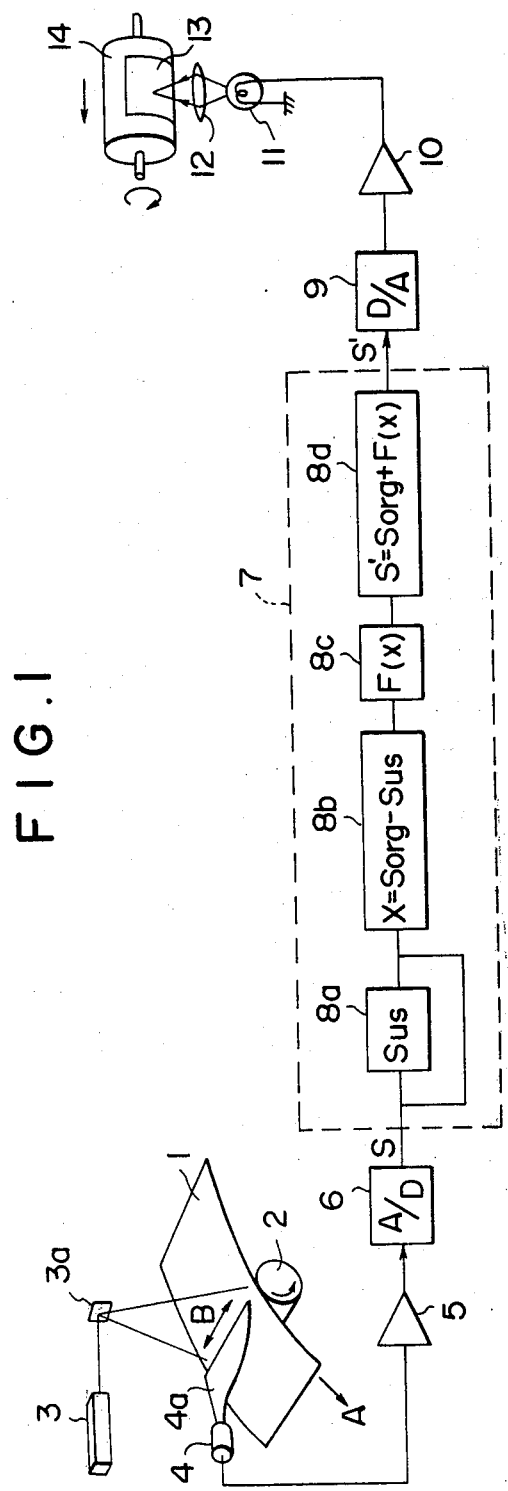
FIG. 1 shows an example of the radiation image recording system in which the image processing method of the present invention is employed.

FIG. 1 shows an example of a radiation image recording system in which the image processing method and apparatus of the present invention are employed. The reference numeral 1 designates a stimulable phosphor sheet in which a radiation image of a human body is recorded by use of X-rays transmitting through a human body in the form of energy stored in the trap level of the stimulable phosphor. The stimulable phosphor sheet 1 is fed by a feed roller 2 in the direction of arrow A. While the stimulable phosphor sheet 1 is fed by the roller 2, it is scanned by a laser beam deflected by a scanning mirror 3a in the direction of arrow B. The laser beam is emitted by a laser source 3 which emits a stimulating laser beam having a wavelength of 500 to 800 nm. Thus, the stimulable phosphor sheet 1 is subjected to laser beam scanning in the primary scanning direction (in the direction of arrow B) and in the sub-scanning direction (in the direction of arrow A). By the scanning, the stimulable phosphor sheet 1 is stimulated and emits light having a wavelength of 300 to 500 nm. The emitted light is collected by a light collecting means 4a made of a light transmitting sheet material like plastics and is received by a photodetector 4 provided at the light exit end of the light collecting means 4a to be converted to an electric signal. The electric signal thus obtained represents the radiation image initially recorded in the stimulable phosphor sheet 1 and then is processed as an image signal. The electric signal is first amplified by an amplifier 5 and converted to a digital signal through an A/D converter 6 and sent to a processing unit 7. In the operating unit 7, the unsharp mask signal Sus is obtained from the image signal by a processing element 8a for calculating the unsharp mask signal Sus and then the difference Sorg-Sus is obtained by a difference signal processing element 8b. Further, the function $F(X)$ is obtained therefrom by a function converter 8c. Finally, an operation represented by the formula (1), $S'=Sorg+F(X)$, is conducted by another processing unit 8d. Then, the obtained digital signal $S'$ is converted to an analog signal by a D/A converter 9 and fed into a recording light source 11 through an amplifier 10.

The light emitted by the recording light source 11 is condensed by a lens 12 and focused on a recording medium 13 like a photographic film mounted on a recording drum 14. Since the light source 11 is driven by the power carrying the analog signal representing the radiation image, a visible radiation image is recorded on the recording medium 13. By use of this image thus obtained, an examination for diagnosis is conducted.

The above-described image processing may be conducted either by directly using the output of the photodetector 4 as in the above described embodiment in an on-line fashion or by using the data recorded on a magnetic tape or the like in an off-line fashion.

The unsharp masking process is conducted by performing the operation represented by the formula $$S'=Sorg+F(X)$$

where $F(X)$ is defined as mentioned hereinbefore.

The unsharp mask signal Sus obtained by the method as mentioned hereinafter should have a modulation transfer function or not less than 0.5 at the spatial frequency of 0.01 cycle/mm and not more than 0.5 at the spatial frequency of 0.5 cycle/mm, preferably not less than 0.5 at the spatial frequency of 0.02 cycle/mm and not more than 0.5 at the spatial frequency of 0.15 cycle/mm. Further, in order to conduct the operation of the above formula, the function $F(X)$ must be determined. This function may be determined for every image case by case by an external operation, or may be selected and determined among preselected several functions memorized in the memory in accordance with the recorded part of the human body or the recorded kind of the disease.

Now the description will be made of several examples of the image processing method in which the function $F(X)$ is concretely determined.

The function $F(X)$ may be selected among preselected various kinds of functions as mentioned above.

However, it is also possible to determine the value of F(X) for every value of X by referring to a table in a table-looking method. In other words, a conversion table for X and F(X) is made on a disc or a memory in advance and the value of F(X) corresponding to the designated value of X can be outputed according to the inputed value of X by use of this table.

In the following description of the embodiments, there will be made description of an embodiment using a fixed function of $$F(X) = \alpha \sqrt{|X_1|}, \quad (8)$$

and another embodiment using a conversion table to be used for obtaining F(X) from designated values of X by a table-looking method.

Figure 2:
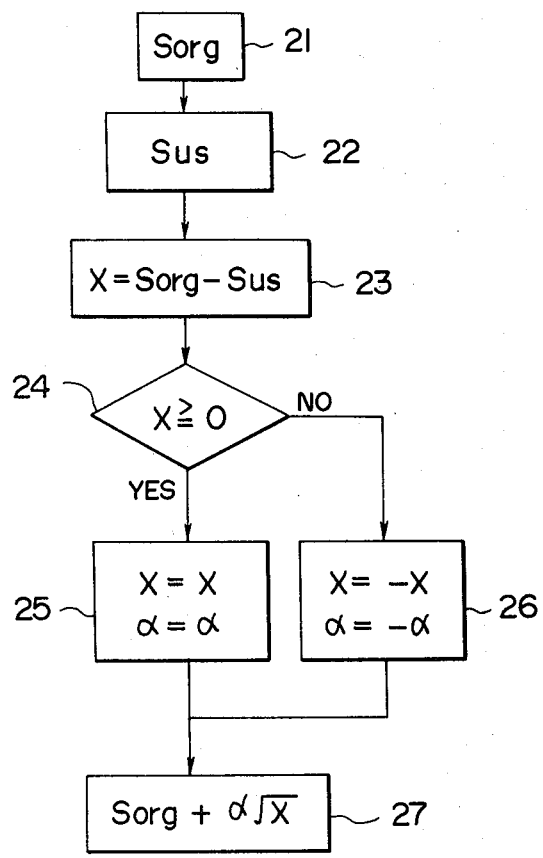
FIG. 2 is a flow chart showing an example of the method of this invention.

FIG. 2 shows a flow chart of the method in which the operation of $F(X)=\alpha\sqrt{|X|}$ is conducted. In this embodiment, an original image signal Sorg is obtained (21) at the scanning point on the stimulable phosphor sheet 1. Then, based on the original image signal Sorg, an unsharp mask signal Sus is obtained by one of the above mentioned methods (22). By use of Sorg and Sus said value X is obtained by the formula X=Sorg-Sus (23). When X is positive or zero, X is made equal to X and $\alpha$ is made equal to $\alpha$ (24,25), and when X is negative X is made equal to $-X$ and $\alpha$ is made equal to $-\alpha$ (24,26) to operate the formula Sorg+F(X) namely Sorg+$\alpha\sqrt{X}$ (27) and obtain the signal S'.

Figure 3:
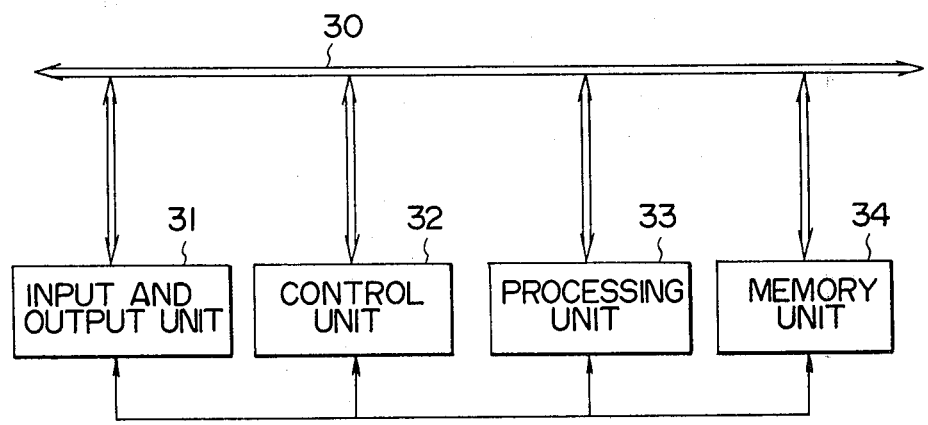
FIG. 3 is a block diagram showing an example of an operating section employed in the apparatus of this invention for carrying out the method of the invention as shown in FIG. 2.

In order to carry out the operation as shown in FIG. 2, an input and output unit 31, a control unit 32, a processing unit 33 and a memory unit 34 are used in connection with a data bus 30 as shown in FIG. 3. The processing unit 33 must have a function to calculate the square root ($\sqrt{\ }$) and perform the four operations.

Figure 4:
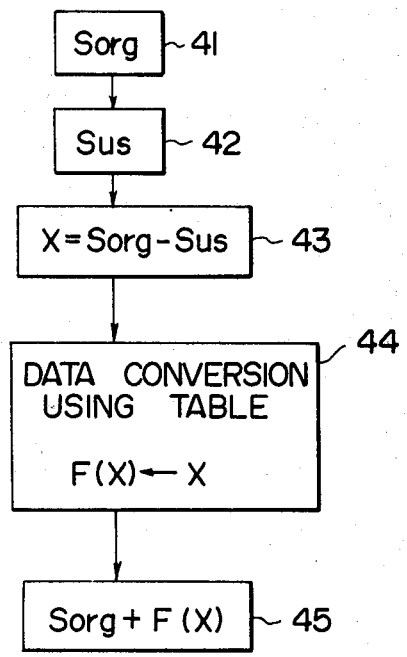
FIG. 4 is a flow chart showing another example of the method of this invention.

FIG. 4 shows a flow chart of the method in which a conversion table is used for conversion of X to F(X), e.g. $F(X)=\alpha\sqrt{X}$. Similarly to the example shown in FIG. 2, Sorg and Sus are first obtained from the scanning points (41,42) and the value X is obtained by the formula X=Sorg-Sus (43). From thus obtained X, values F(X) corresponding to X are obtained referring to the conversion table (44). By use of thus obtained F(X), the operation of Sorg+F(X) is conducted (45), and the signal S' is obtained.

Figure 5:
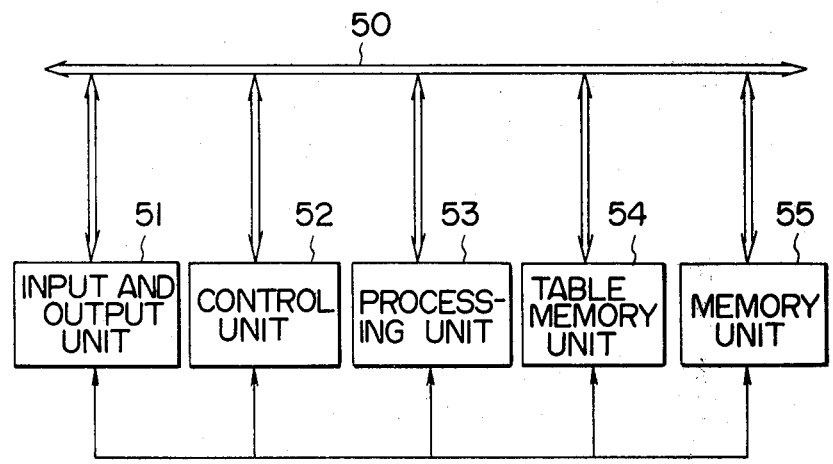
FIG. 5 is a block diagram showing an example of an operating section employed in this invention for carrying out the method as shown in FIG. 4.

In order to carry out the operation as shown in FIG. 4, an input and output unit 51, a control unit 52, a processing unit 53, a table memory unit 54 which is used for conversion of X to F(X) and a memory 55 are used in connection with a data bus 50 as shown in FIG. 5. The processing unit 53 used here may have capability enough to conduct addition and subtraction since it is unnecessary to make an operation of $F(X)=\alpha\sqrt{X}$.

Further, by conducting a smoothing process for reducing high frequency components in the above obtained signal S', it is possible to reduce the noise in the finally recorded radiation image without damaging the information necessary for diagnosis.

In addition to the above mentioned frequency emphasis by use of the unsharp mask, it is possible to provide a gradation process for changing the gradation of the image. When the gradation process is conducted before the unsharp masking process, the A/D conversion is conducted after the signal has been gradation processed with a nonlinear analog circuit. When the gradation process is conducted after the unsharp masking process, the gradation process can be conducted in the digital form or may be conducted in the analog form after D/A conversion. Further, it is possible to conduct the gradation process in the digital form after A/D conversion before the unsharp masking process.

When the image is reproduced finally on the photographic film, a size reduced image can be obtained by recording the image with a higher sampling frequency than the frequency at the time of input scanning. For instance, if the input scanning system has a sampling frequency of 10 pixel/mm and the output scanning system has a sampling frequency of 20 pixel/mm, the finally obtained image as a ½ reduced size with respect to the original image size.

The size reduced image having a reduction rate of ½ to ⅓ is desirable for enhancing further the diagnosis efficiency and accuracy since the frequency component which is necessary for diagnosis becomes close to the frequency at the highest visibility and accordingly the contrast appears to have been raised to the observer.

Further, in the above embodiments, the original image signal Sorg includes the signal which has been subjected to the band compression and or nonlinear correction like logarithmic compression. In practical use, the original image signal is desired to be a signal subjected to a band compression like log-compression or the like since the signal is the output of the photodetector which represents the level of brightness. It is of course possible to use directly the output signal of the photodetector as Sorg without any processing. Further, theoretically, the calculation of the unsharp mask signal should be based on the signal representing the energy itself. According to the experiments, however, it has been proved that the mean value obtained based on the log-compressed value corresponding to the density not to the energy showed the same results in the viewpoint of diagnostic efficiency and accuracy. This is practically very convenient and advantageous in conducting the operation.

Now the present invention will be further described with reference to several examples thereof.

EXAMPLE 1

50 samples of typical radiation images of various portions of a human body were examined both in the form of the conventional radiographic image and in the form of the radiation image recorded on a recording medium by way of the radiation image processing method in accordance with the present invention. In the image processing method according to this invention, as the function F(X) were selected nonlinear functions represented by curves A, B and D in FIG. 6 and a combination of linear functions represented by a combined straight line C in FIG. 6. Specifically, the diagnostic efficiency and accuracy were compared between these two types of images.

Figure 6:
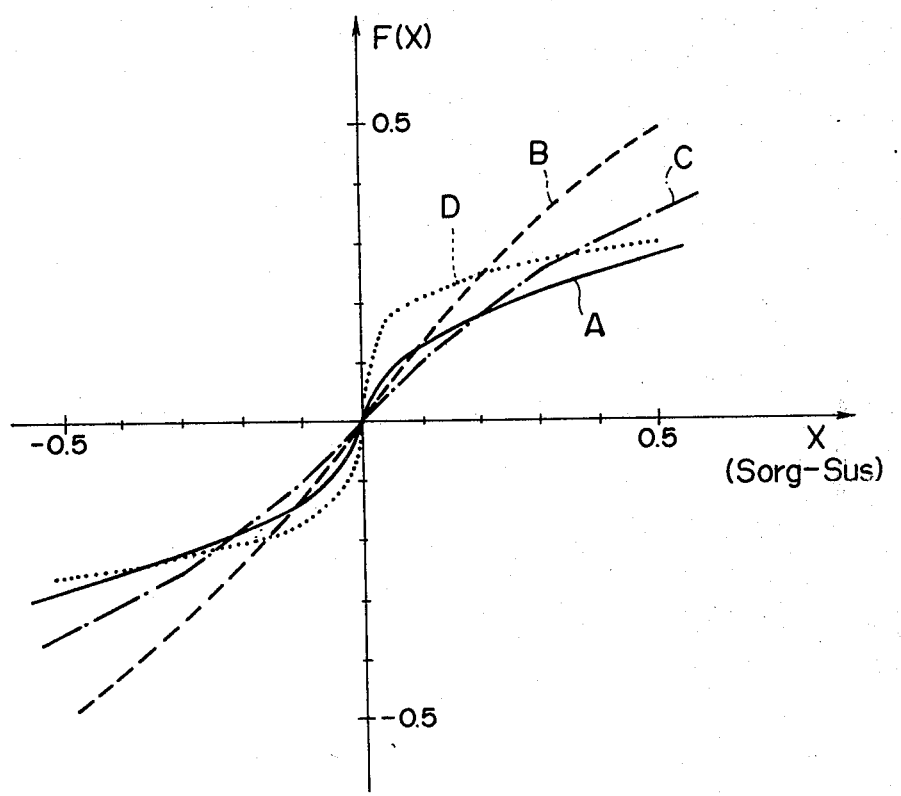
FIG. 6 is a graphical representation showing various examples of the function $F(X)$ of the formula $S'=Sorg+F(X)$ employed in the method of this invention.

The solid line A in FIG. 6 represents a curve of $F(X)=0.4 \cdot \text{sgn}(X)|X|^{\frac{1}{2}}$, namely said function (2) in which substitutions are made of $\alpha=0.4$, $n=\frac{1}{2}$ and $b=0$. This is a continuous nonlinear function in which the gradient F'(X) decreases as $|X|$ increases and F''(X) is negative when X is positive and positive when X is negative.

The broken line B in FIG. 6 represents a curve of $F(X)=1-3^{-1.4x}$ (X>0), $F(X)=-1+e^{1.4x}$ (X<0), namely said function (4) in which the coefficient of X is made 1.4. This is also a continuous nonlinear function in which the gradient F'(X) decreases as $|X|$ increases and F"(X) is negative when X is positive and positive when X is negative.

The chain line C in FIG. 6 represents a combination of linear functions represented by a formula $F(X)=sgn(X)(n|X|+const)$ wherein n is decreased as $|X|$ increases, namely said function (5) in which substitutions are made of a=1, b=0.75, c=0.025, d=0.5, $|X_1|=0.1$ and $|X_2|=0.3$. That is, this function is a combination of the following linear functions.

$F(X) = X$                      $X < 0.1$
$F(X) = sgn(X)(0.75|X| + 0.025)$    $0.1 \leq |X| < 0.3$
$F(X) = sgn(X)(0.5|X| + 0.1)$       $0.3 \leq |X|$ In this function, the gradient F'(X) stepwisely decreases as $|X|$ increases, and F"(X) is zero.

The dot line D in FIG. 6 represents a function obtained by use of a conversion table in which the outline is convex upwards in the region of X>0 and convex downwards in the region of X<0. Further, the example shown in FIG. 6 is not symmetric with respect to the origin. This function is employed by use of the table-looking method.

The results of the tests conducted by use of these functions were evaluated by four radiologists since it was impossible to evaluate the diagnostic efficiency and accuracy by the objective physical evaluation by use of sharpness, contrast and granularity.

The results of the evaluation were as shown in the following TABLE 1.

TABLE 1

Head: The skull was not saturated in white. No artifact in the form of black lines was observed in the muscle of the face. The image was clear and had high diagnostic efficiency and accuracy for tumor.

Bones and muscles: No artifact was observed in the bones or the muscles. Accurate diagnosis was possible for both the bones and the muscles.

Angiography: No artifact was observed around the blood vessels. Accurate diagnosis was possible for both the thin and thick portions of the blood vessels.

Double contrast of stomach: No artifact was observed in either the peripheral portion of the stomach or the portion filled with the contrast media. Accurate diagnosis was possible in the whole image of the stomach.

Abdomen: The gas-filled portion of the intestine was not over-emphasized. The diagnostic efficiency and accuracy were improved for the whole abdomen.

Although there was a little observed slight difference in the degree of improvement in the diagnostic efficiency and accuracy between the results obtained by use of the curves A, B and D, and the combination of straight lines C in FIG. 6, there was not recognized a substantial difference between those results using different curves or lines in any portion of the human body.

EXAMPLE 2

Figure 7:
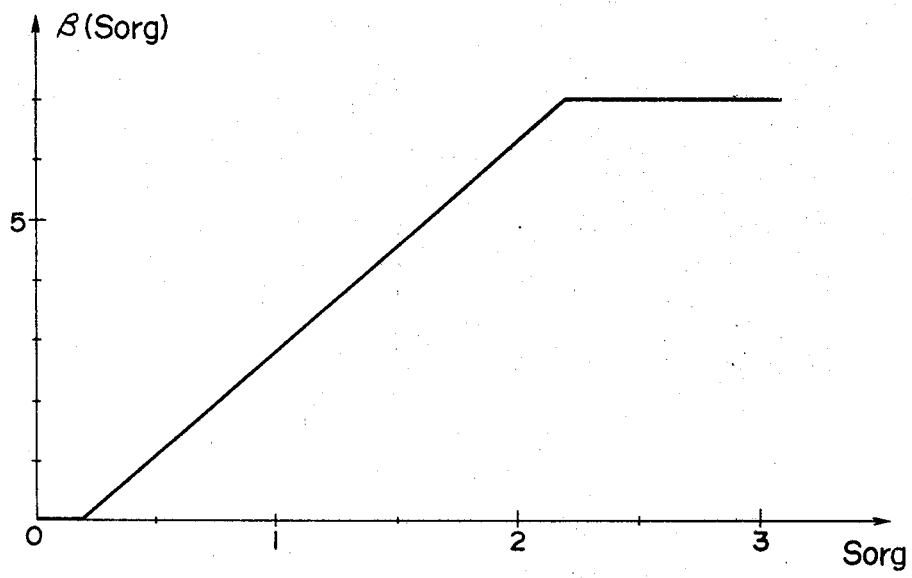
FIG. 7 is a graphical representation showing an example of the function $\beta(Sorg)$ of the formula $S'=Sorg+\beta(Sorg)\cdot f(X)$ used in the present invention.
Figure 8:
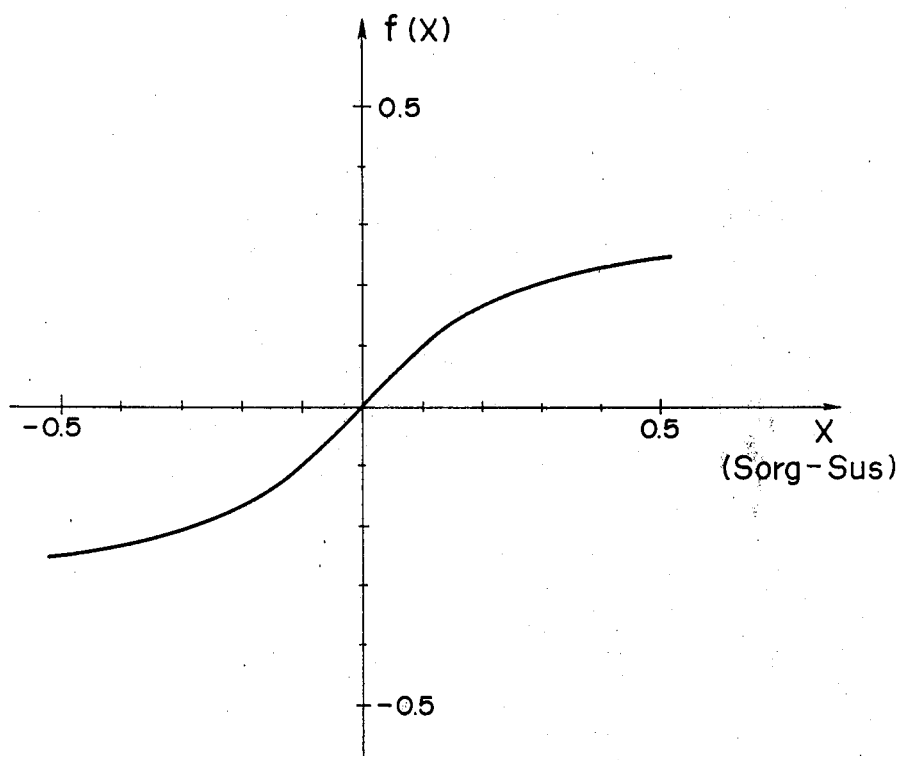
FIG. 8 is a graphical representation showing an example of the function $f(X)$ of the formula $S'=Sorg+\beta(Sorg)\cdot f(X)$ used in the present invention.

As to the various portions of the human body as shown in TABLE 2 below, as many as 30 examples were examined by use of a composite function $F(X,Sorg)$ of $\beta(Sorg)$ as shown in FIG. 7 and $f(X)$ as shown in FIG. 8 in the same method as described in EXAMPLE 1. The function $\beta(Sorg)$ shown in FIG. 7 is a function as represented by the following formulae.

$\beta(Sorg) = 0$                $0 \leq Sorg < 0.2$
$\beta(Sorg) = 3.5Sorg - 0.7$    $0.2 \leq Sorg < 2.2$
$\beta(Sorg) = 7.0$             $Sorg \geq 2.2$ This function means that the higher is the level of the original signal, the higher becomes the degree of frequency emphasis. The function f(X) shown in FIG. 8 is a function as represented by the following formulae.

$f(X) = X$              $(|X| < 0.1)$ $f(X) = 0.16\left[1 - \exp\left\{-\frac{1}{0.16}(X - 0.1)\right\}\right] + 0.1$    $(X \geq 0.1)$ $f(X) = -0.16\left[1 - \exp\left\{\frac{1}{0.16}(X + 0.1)\right\}\right] - 0.1$    $(X \leq -0.1)$ This function f(X) corresponds to said formula (6) in which substitutions are made of $\alpha=0.1$, b=0.16 and $X_1=0.1$. This is a function made of a combination of a straight line and curves smoothly combined into a continuous increasing function. The gradient f'(X) of this function f(X) is a constant in a range of $|X|<0.1$ and continuously decreases in a range of $|X|\geq 0.1$ as $|X|$ increases. Further, f"(X) is zero in the range of $|X|<0.1$ and negative when X is positive and positive when X is negative in the range of $|X|\geq 0.1$.

In the above examination also, the results of the obtained images were objectively evaluated by four radiologists similarly to EXAMPLE 1.

The results of the evaluation were as shown in the following TABLE 2.

TABLE 2

Head: Soft tissues were made further easy to observe as compared with EXAMPLE 1 and artifacts around the skull and the face muscle were not observed. Accordingly, even fine tumor could be accurately and easily diagnosed.

Bones and muscles: Both the bones and muscles were made clear and easy to observe free from artifacts. Even around the boundaries therebetween, there was not observed any artifact and accurate diagnosis was possible.

Double contrast of stomach: The image of the stomach was made further clear as compared with EXAMPLE 1 and the diagnostic efficiency and accuracy thereof were improved. Besides, no artifacts were observed in the peripheral portion and the portion filled with the contrast media. Accurate examination for diagnosis was therefore easily conducted.

Furthermore, the results were not substantially changed when the f(X) curve as shown in FIG. 8 was replaced by the curves A, B, D or a combination of lines C as shown in FIG. 6.

As clearly shown in TABLE 2, the occurrence of the artifacts was effectively prevented and the diagnostic efficiency and accuracy were fairly improved inspite of the improvement in the image quality of the fine structure of the various portions of the human body of the samples.

It will be understood in FIGS. 6, 7 and 8 that the original image signal Sorg, the unsharp mask signal Sus and the difference signal X therebetween all mean the signals which are obtained by making log conversion and nonlinear correction on the output of the photodetector, namely values corresponding to the density of the image.

As shown in the above results, in accordance with the present invention, the occurrence of artifacts was effectively prevented and the diagnostic efficiency and accuracy were improved in various examples of the images of a number of kinds of portions of the human body.

Thus, the method and apparatus of the present invention are capable of markedly enhancing the diagnostic efficiency and accuracy in the radiation image recording system using a stimulable phosphor by processing the image in the course of recording a visible radiation image based on a radiation image once recorded in the stimulable phosphor. This is practically very advantageous in the field of medical diagnosis.

We claim:

1. A method of processing a radiation image in a radiation image recording system in which a stimulable phosphor is scanned with a stimulating ray and the radiation image information recorded in the stimulable phosphor is read out and converted into an electric signal upon stimulation thereof and then a visible image is recorded on a recording material by use of the electrical signal, said method comprising a step of conducting an operation represented by a formula $$S' = Sorg + F(X)$$

is conducted at every scanning point, where Sorg is the original image signal read out from the stimulable phosphor, Sus is an unsharp mask signal corresponding to a super-low spatial frequency, X is Sorg-Sus, and F(X) is a monotomically increasing function which satisfies the condition of $F'(X_1) \geq F'(X_2) \geq 0$ for arbitrary values $X_1$, $X_2$ of X ($|X_1| < |X_2|$) and in which there exists at least one certain value $X_0$ of X which satisfies the condition of $F'(X_1) > F'(X_2)$ when $|X_1| < |X_0| < |X_2|$, whereby the frequency component above said super-low spatial frequency is emphasized.

2. A method of processing a radiation image in a radiation image recording system as defined in claim 1 wherein said unsharp mask signal corresponds to the modulation transfer function which is not less than 0.5 at the spatial frequency of 0.01 cycle/mm and not more than 0.5 at the spatial frequency of 0.5 cycle/mm.

3. A method of processing a radiation image in a radiation image recording system as defined in claim 1 wherein said unsharp mask signal corresponds to the modulation transfer function which is not less than 0.5 at the spatial frequency of 0.02 cycle/mm and not more than 0.5 at the spatial frequency of 0.15 cycle/mm.

4. A method of processing a radiation image in a radiation image recording system as defined in any one of claims 1 to 3 wherein said monotomically increasing function F(X) is a nonlinear function which satisfies the conditions of $F''(X) < 0 \ (X > 0)$, and
$F''(X) > 0 \ (X < 0)$.

5. A method of processing a radiation image in a radiation image recording system as defined in any one of claims 1 to 3 wherein said monotomically increasing function F(X) is mainly composed of a nonlinear function which satisfies the conditions of $F''(X) < 0 \ (X > 0)$, and -continued
$F''(X) > 0 \ (X < 0)$ and partly includes a linear function represented by $F''(X) = 0$.

6. A method of processing a radiation image in a radiation image recording system as defined in any one of claims 1 to 3 wherein said monotomically increasing function F(X) is a combination of a plurality of linear functions which approximate a nonlinear function satisfying the conditions of $F''(X) < 0 \ (X > 0)$, and
$F''(X) > 0 \ (X < 0)$.

7. A method of processing a radiation image in a radiation image recording system as defined in claim 4 wherein said monotomically increasing function F(X) is a nonlinear function represented by $$F(X) = \alpha \cdot sgn(X) \cdot |X|^n + b$$

wherein $\alpha$ and b are constants and $\alpha > 0$, $0 < n < 1$, and $sgn(X) = 1 \ (X > 0)$, $sgn(X) = -1 \ (X < 0)$, and $sgn(X) = 0 \ (X = 0)$.

8. A method of processing a radiation image in a radiation image recording system as defined in claim 4 wherein said monotomically increasing function F(X) is a nonlinear function represented by $$F(X) = \alpha \cdot \sin(pX)$$

where $|pX| < \pi/2$ and $\alpha > 0$.

9. A method of processing a radiation image in a radiation image recording system as defined in claim 4 wherein said monotomically increasing function F(X) is a nonlinear function represented by $F(X) = 1 - e^{-x} \ (X > 0)$, and $F(X) = 1 + e^x \ (X < 0)$.

10. An apparatus for processing a radiation image in a radiation image recording system comprising a stimulating ray source for emitting a stimulating ray which scans a stimulable phosphor and stimulates the phosphor to have the phosphor emit light according to a radiation image recorded therein, a photodetector for detecting the emitted light and converting the light to an electric signal, and an processing unit means for processing the electric signal, said processing unit means conducting an operation represented by a formula $$S' = Sorg + F(X)$$

is conducted at every scanning point, where Sorg is the original image signal read out from the stimulable phosphor, Sus is an unsharp mask signal corresponding to a super-low spatial frequency, X is Sorg-Sus, and F(X) is a monotomically increasing function which satisfies the condition of $F'(X_1) \geq F'(X_2) \geq 0$ for arbitrary values $X_1$, $X_2$ of X ($|X_1| < |X_2|$) and in which there exists at least one certain value $X_0$ of X which satisfies the condition of $F'(X_1) > F'(X_2)$ when $|X_1| < |X_0| < |X_2|$.

* * * * *